(12) United States Patent
Kobayashi et al.

(10) Patent No.: US 12,280,710 B2
(45) Date of Patent: Apr. 22, 2025

(54) LAMP LIGHTING CONTROL SYSTEM

(71) Applicant: SUBARU CORPORATION, Tokyo (JP)

(72) Inventors: Harunori Kobayashi, Tokyo (JP); Noriaki Asano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/925,725

(22) PCT Filed: Sep. 29, 2021

(86) PCT No.: PCT/JP2021/035793
§ 371 (c)(1),
(2) Date: Nov. 16, 2022

(87) PCT Pub. No.: WO2023/053251
PCT Pub. Date: Apr. 6, 2023

(65) Prior Publication Data
US 2024/0217428 A1 Jul. 4, 2024

(51) Int. Cl.
*B60Q 1/18* (2006.01)
*B60Q 1/34* (2006.01)
(52) U.S. Cl.
CPC .............. *B60Q 1/18* (2013.01); *B60Q 1/34* (2013.01); *B60Q 2400/30* (2013.01)
(58) Field of Classification Search
CPC .... B60Q 1/2696; B60Q 1/346; B60Q 1/2603; F21S 43/14; F21S 43/15
See application file for complete search history.

(56) References Cited

U.S. PATENT DOCUMENTS

| | | | | |
|---|---|---|---|---|
| 9,651,211 B2* | 5/2017 | Potter | ................... | F21S 43/235 |
| 9,677,735 B2* | 6/2017 | Hardy | ..................... | F21S 43/33 |
| 10,344,938 B2* | 7/2019 | Norris | ..................... | B60Q 1/34 |
| 10,648,633 B2* | 5/2020 | Paradis | ................. | F21S 43/243 |
| 11,358,522 B2* | 6/2022 | Kwon | ..................... | F21S 43/19 |
| 11,761,600 B2* | 9/2023 | Wu | ........................... | F21V 7/06 |
| | | | | 362/509 |

FOREIGN PATENT DOCUMENTS

JP 2006-286262 A 10/2006

OTHER PUBLICATIONS

International Search Report in the corresponding International Application No. PCT/JP2021/035793 dated Nov. 16, 2021, with English Translation (4 pages).

* cited by examiner

*Primary Examiner* — Matthew J. Peerce
(74) *Attorney, Agent, or Firm* — Rimon P.C.

(57) ABSTRACT

Provided is a lamp lighting control system including a turn lamp, a position lamp configured to provide a light-emitting face included in a light-emitting face provided by the turn lamp, an accessory lamp configured to provide a light-emitting face at least partially identical to the light-emitting face provided by the turn lamp, and a lighting control unit that is configured to control lighting states of the turn lamp, the position lamp, and the accessory lamp. The lighting control unit is configured to turn off the accessory lamp in a case where the position lamp is turned on and the turn lamp is turned on, and turn on the accessory lamp in a case where the position lam is turned on and the turn lamp is turned off.

4 Claims, 12 Drawing Sheets

[FIG. 1]
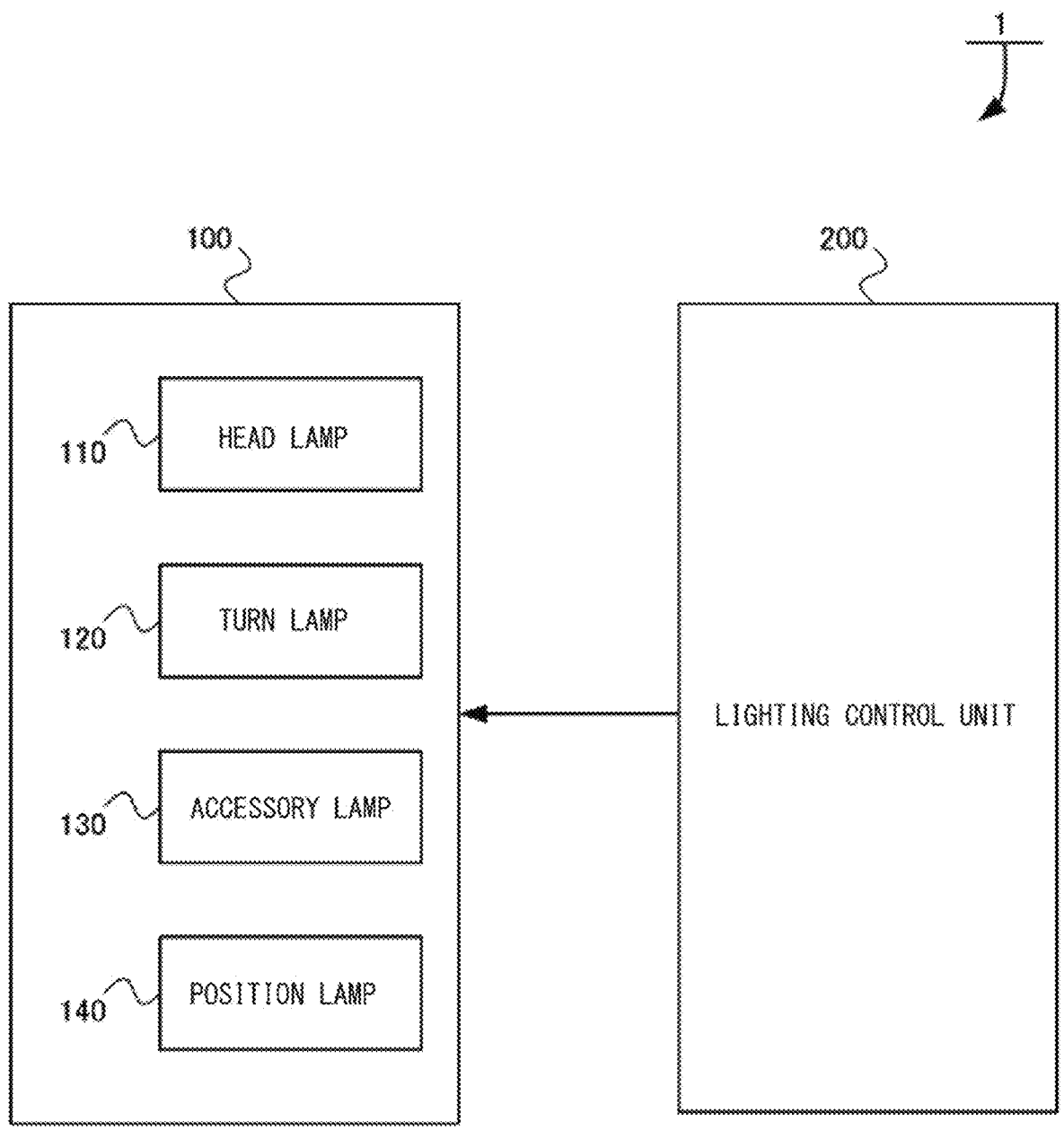

[FIG. 2]
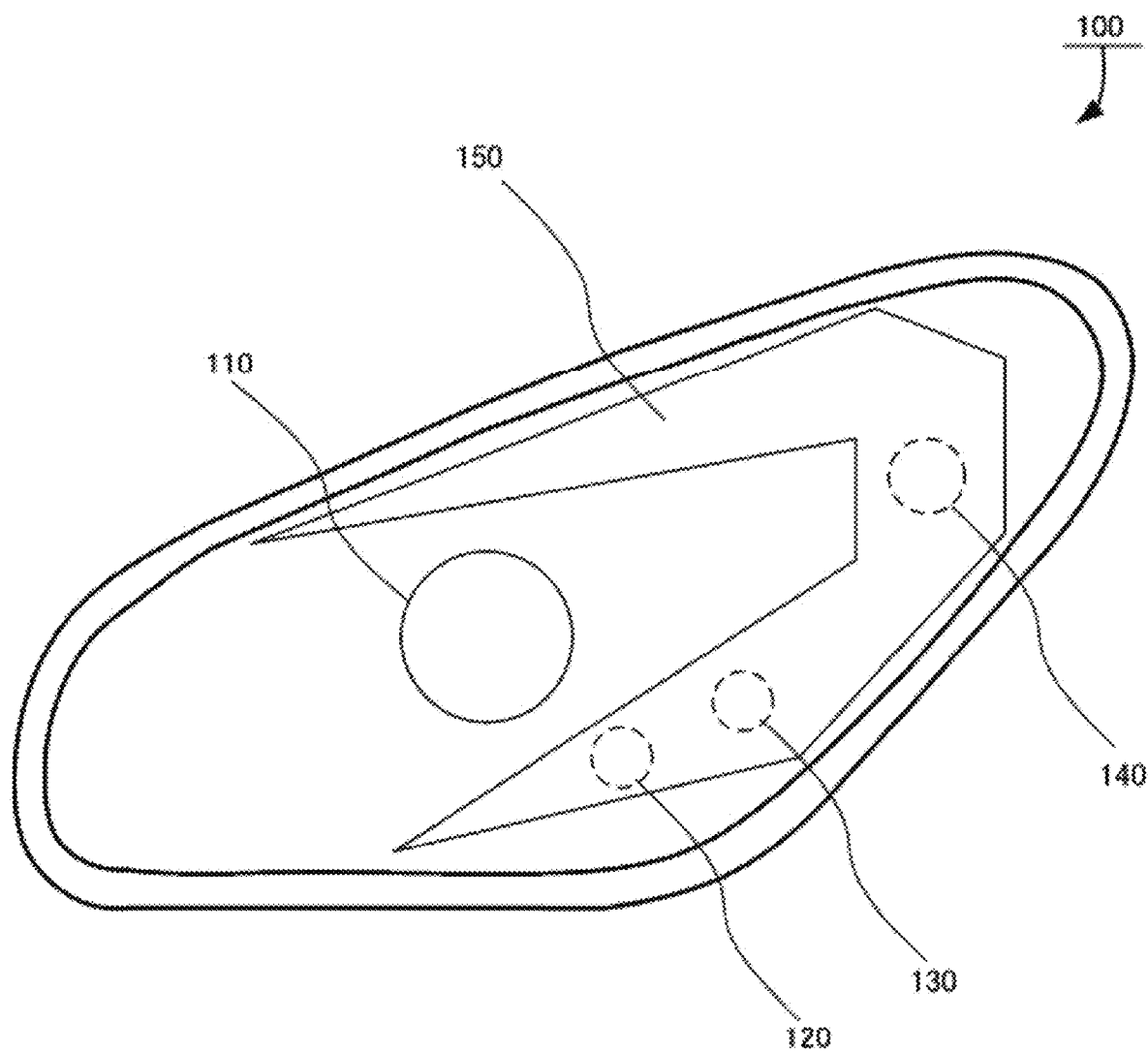

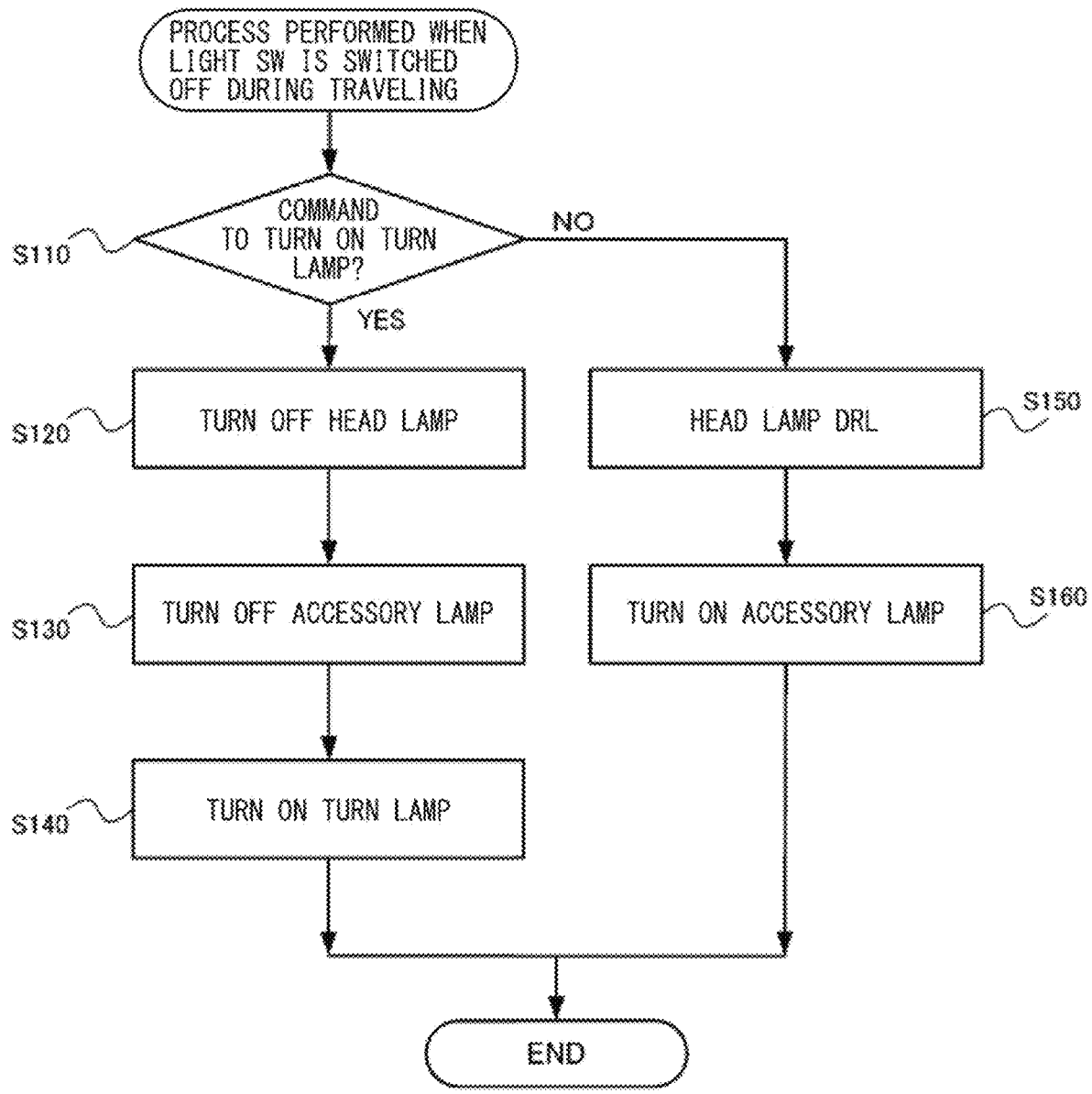

[ FIG. 4 ]
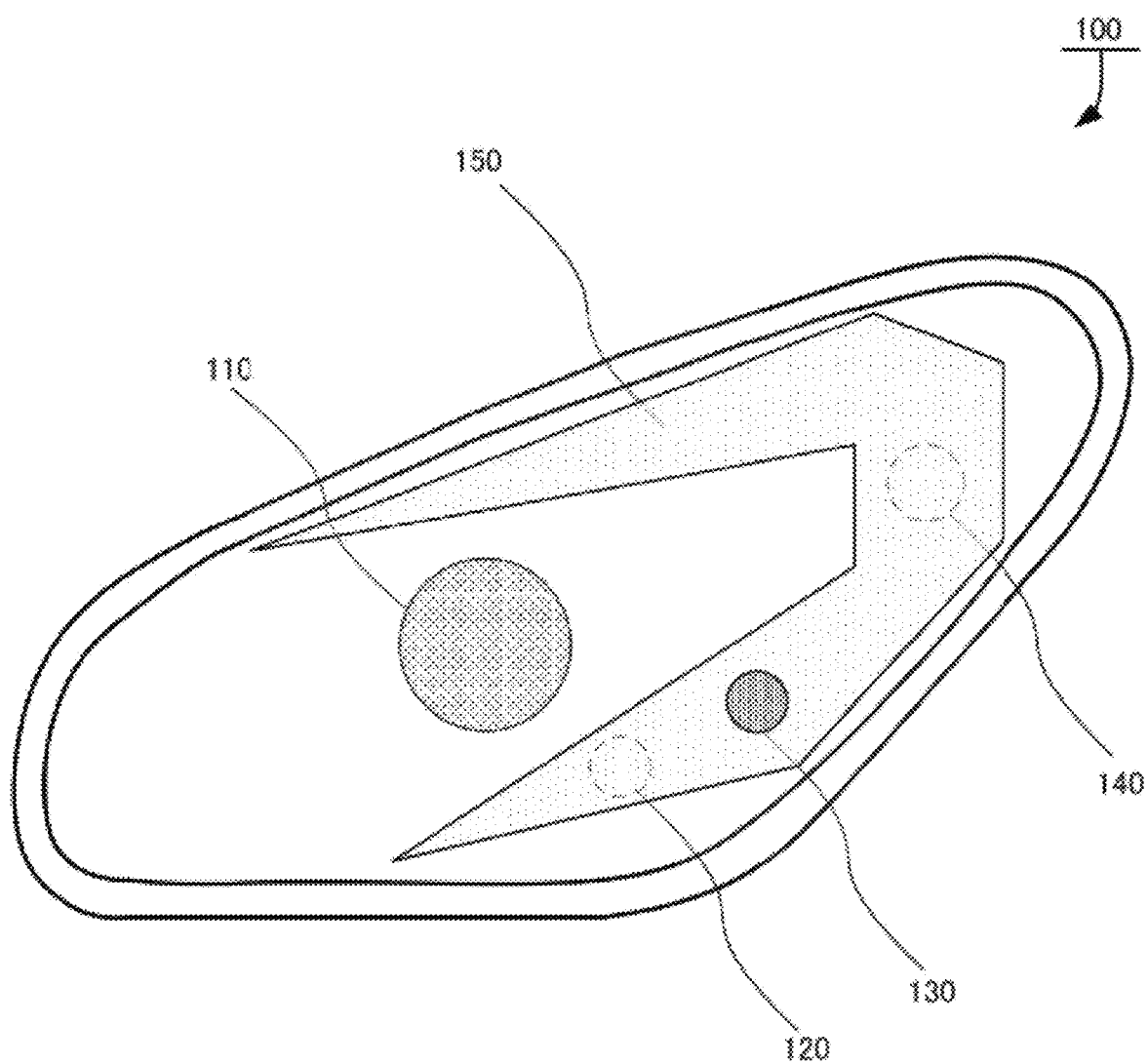

[FIG. 5]
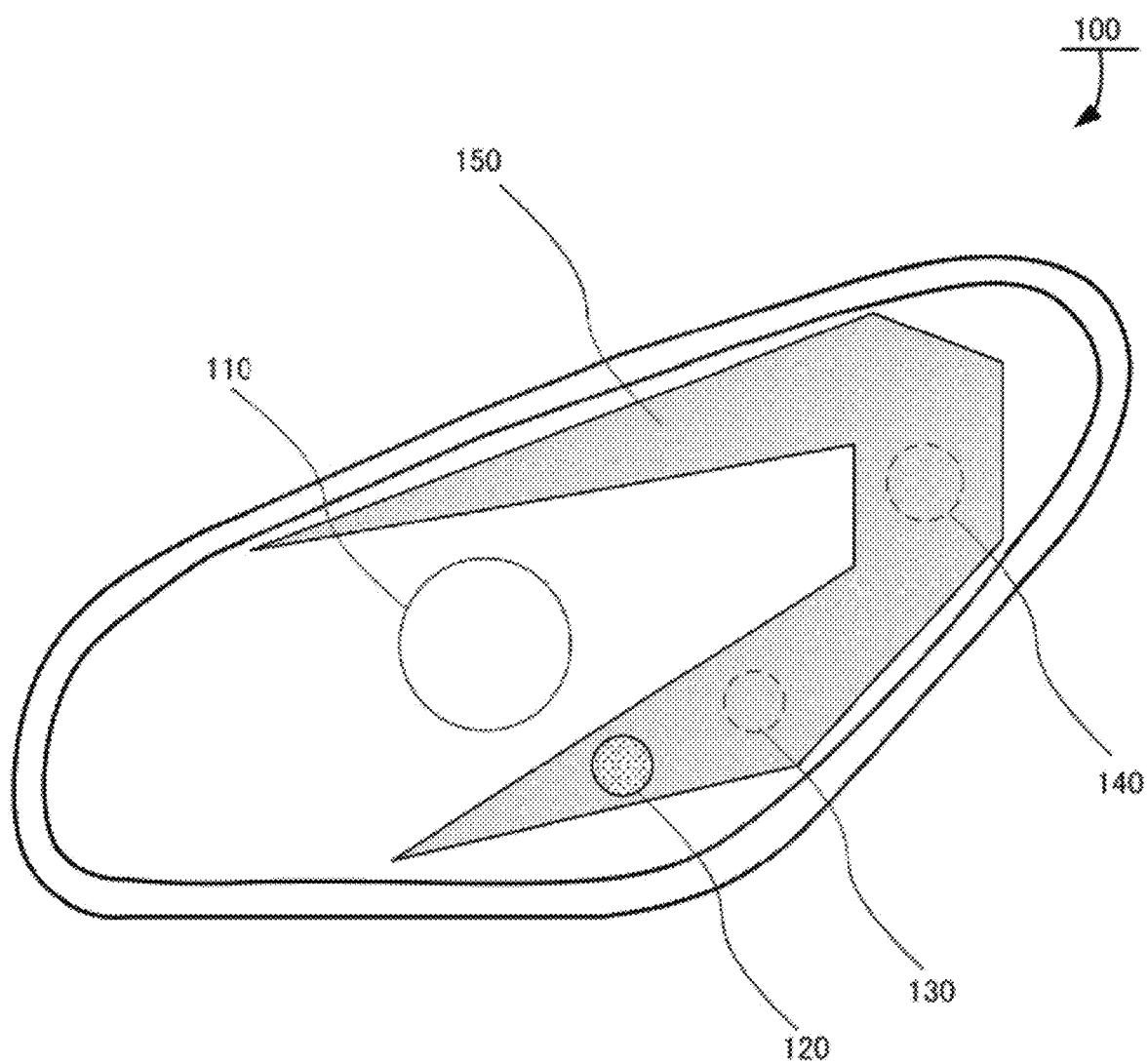

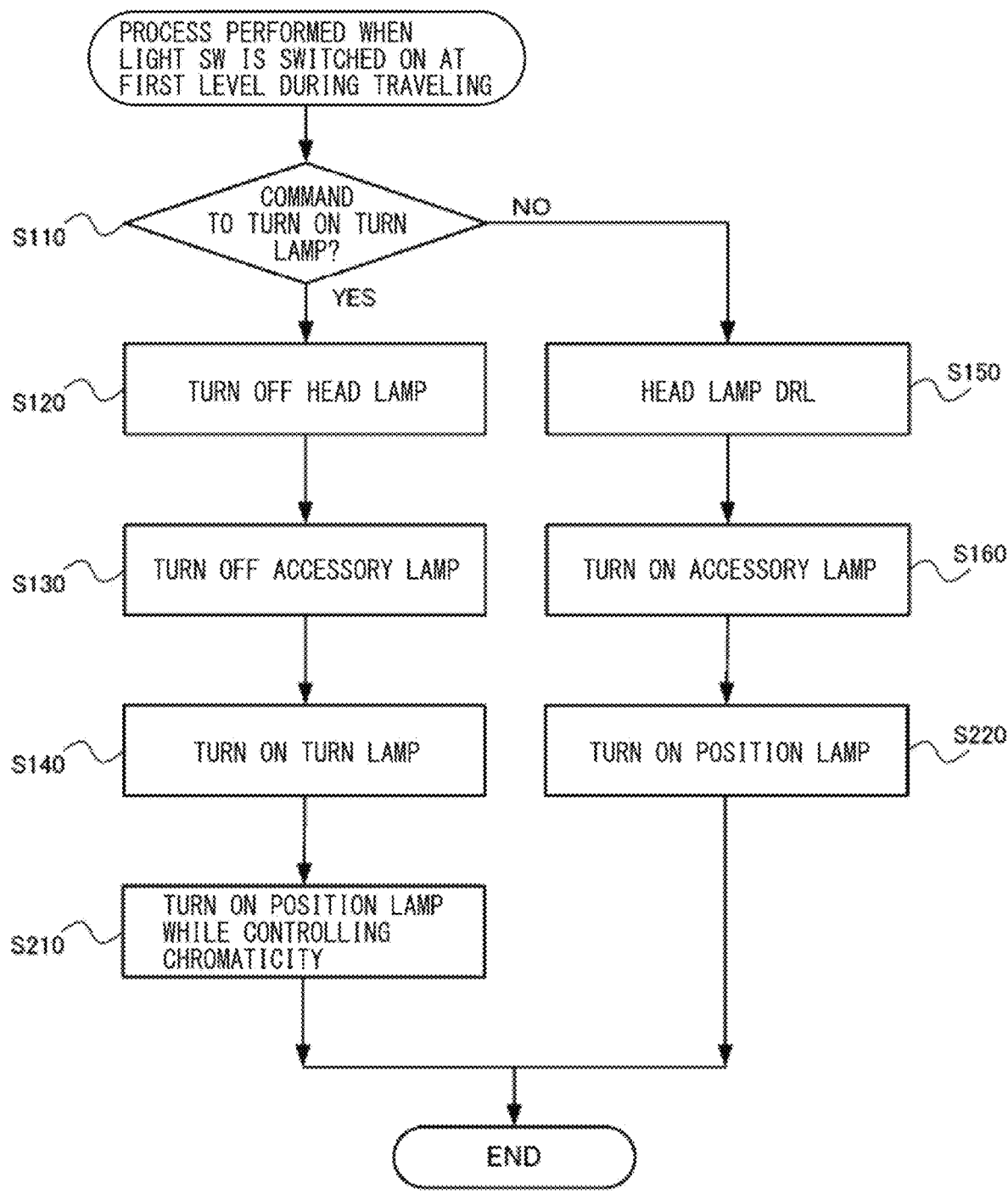

[FIG. 7]
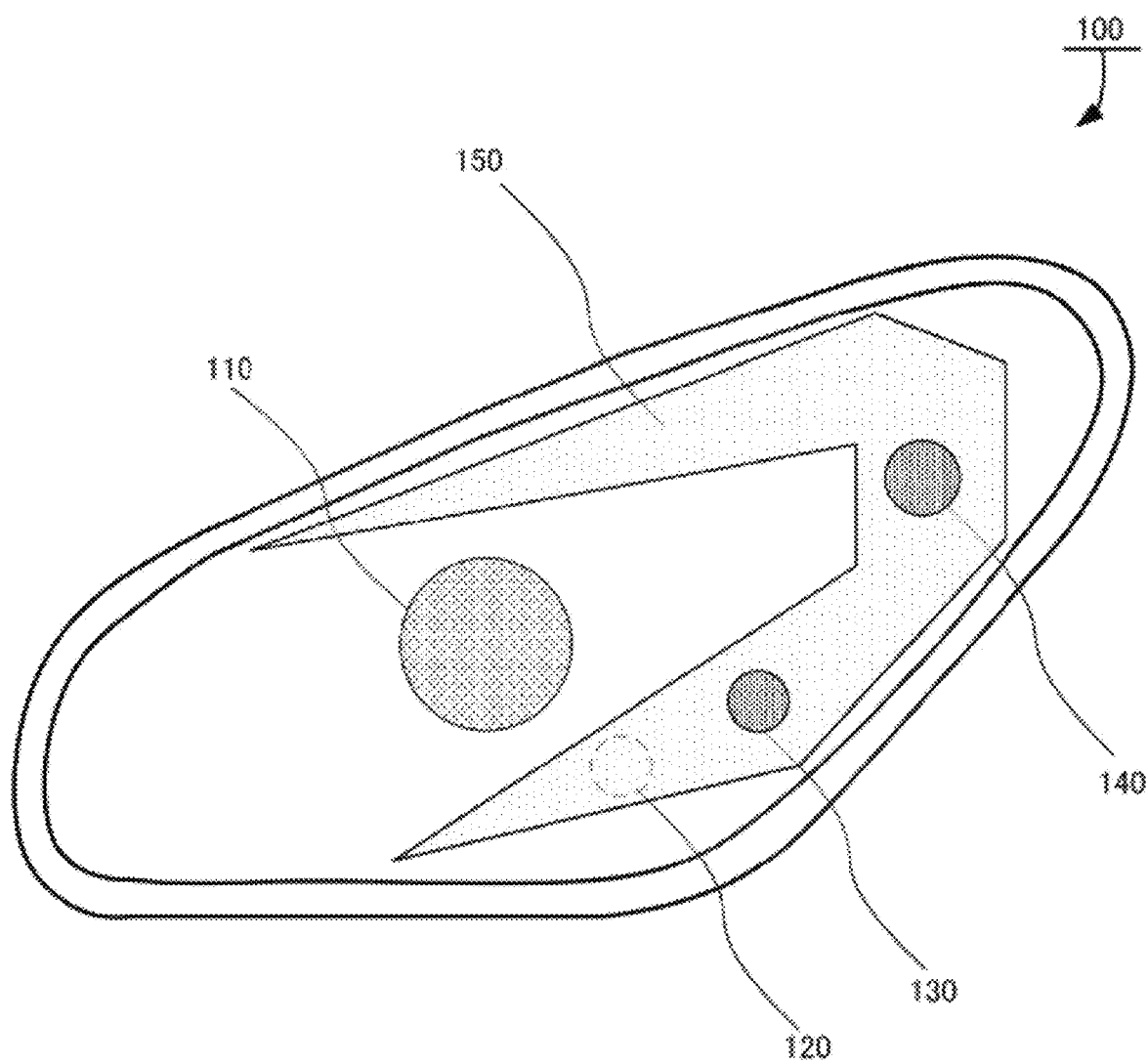

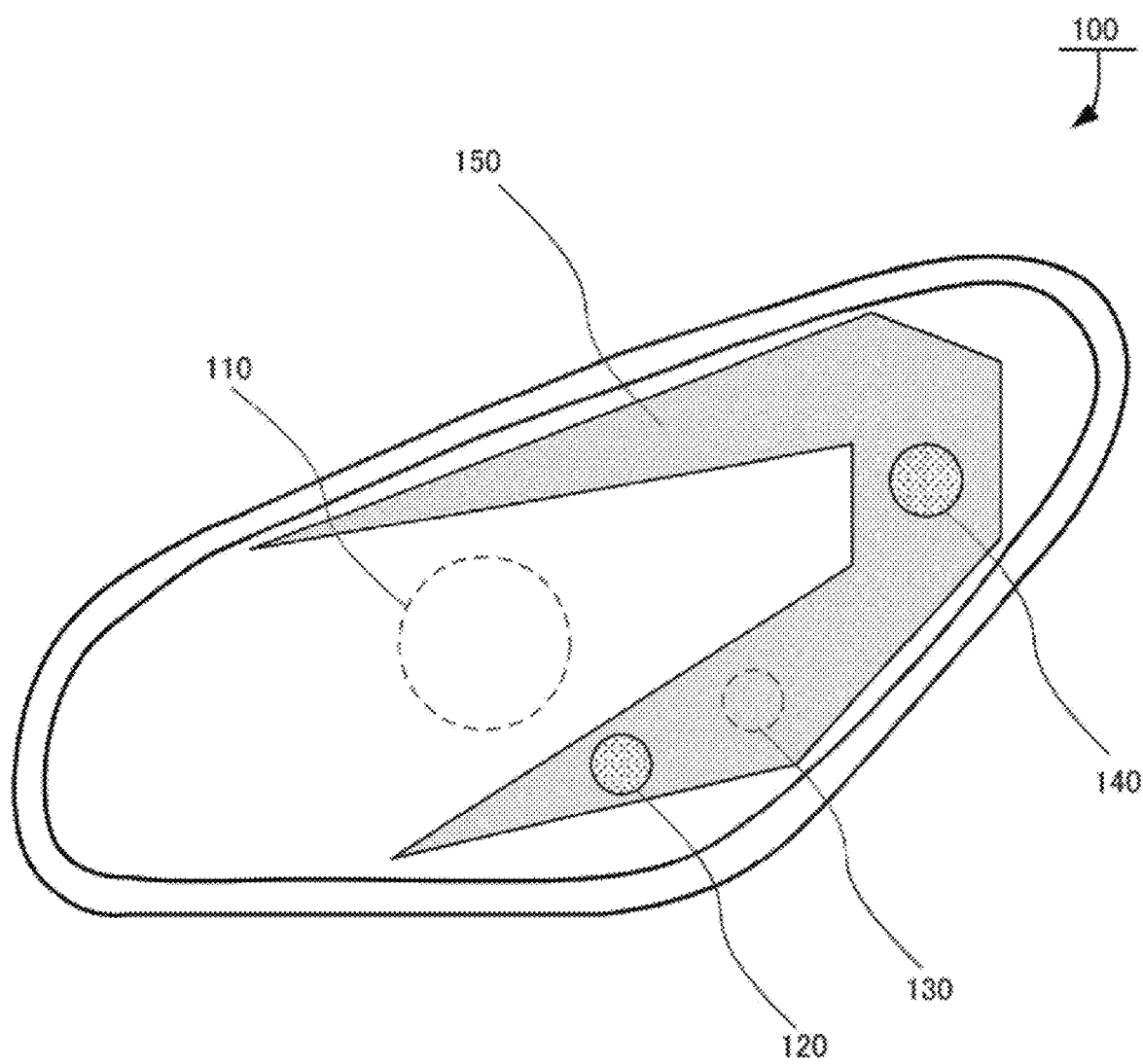
[FIG. 8]

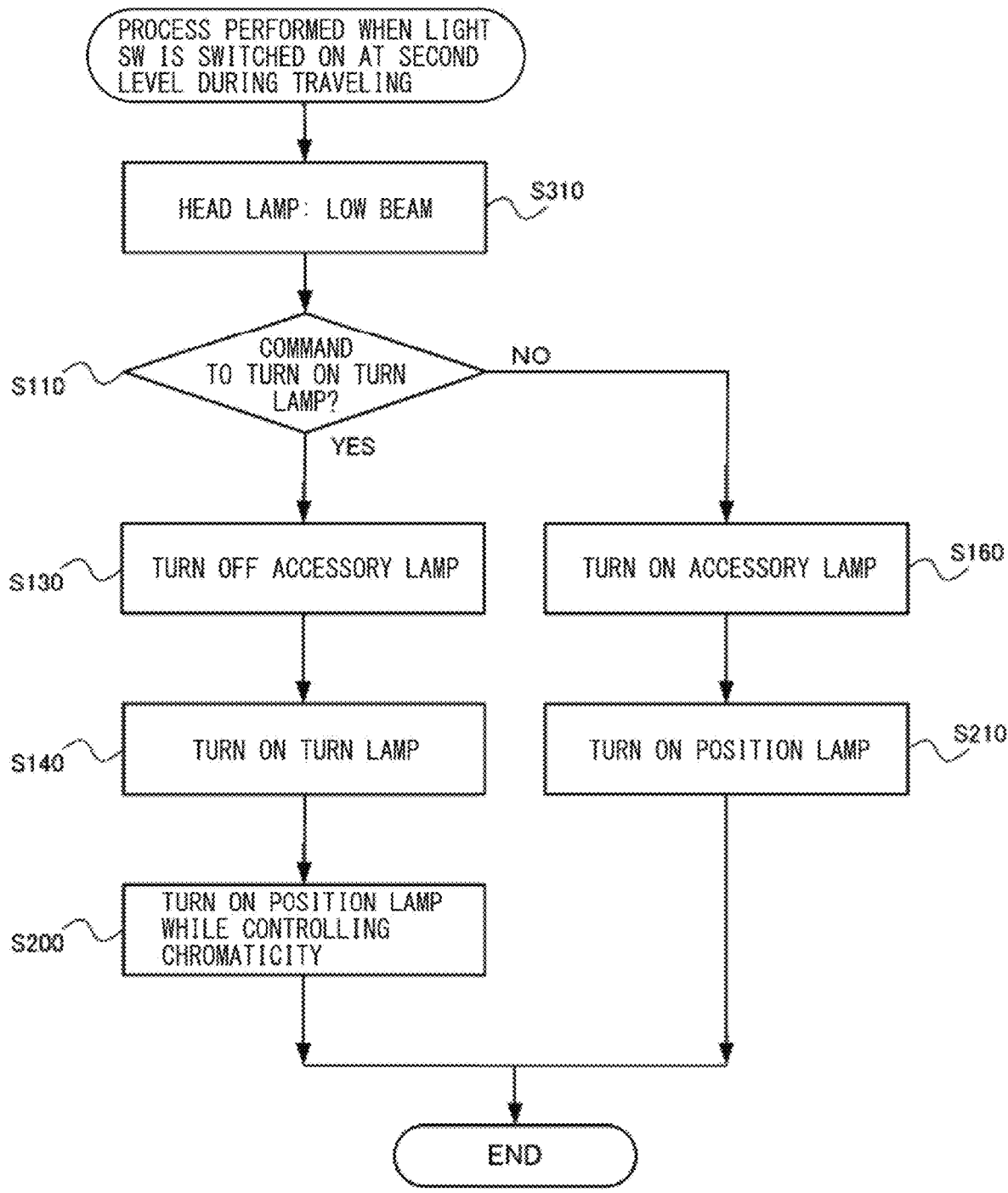

[ FIG. 10 ]
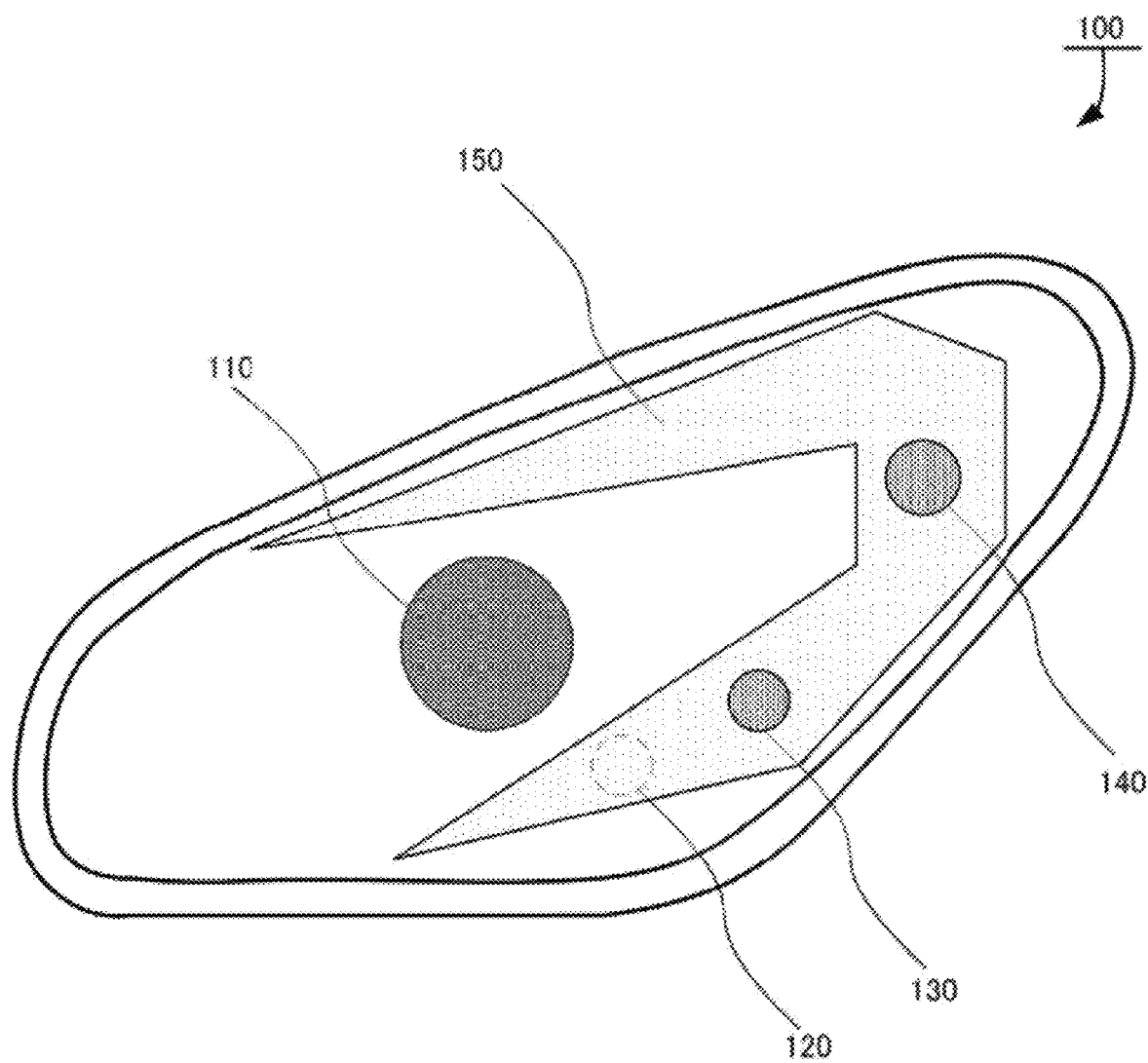

[FIG. 11]
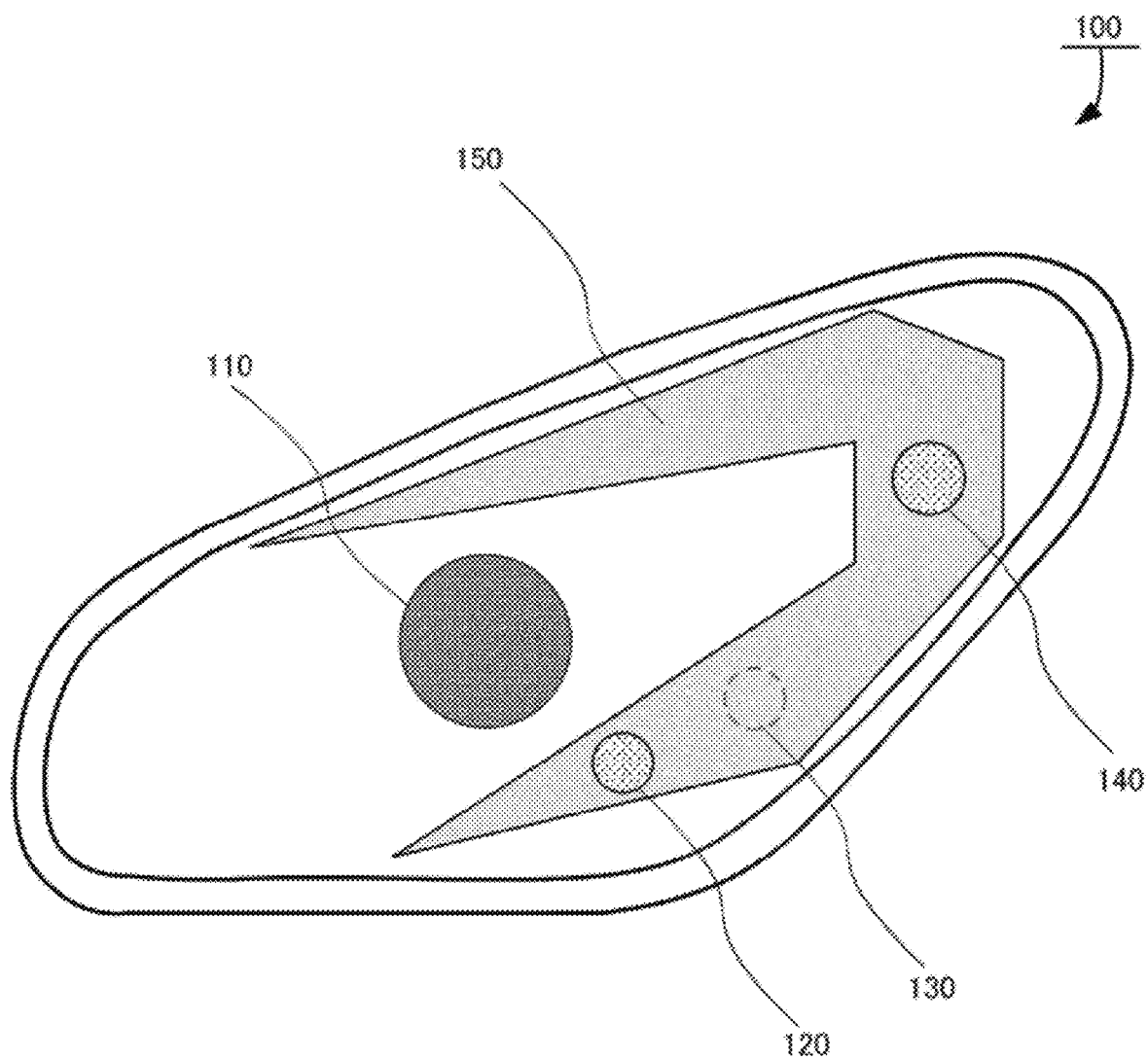

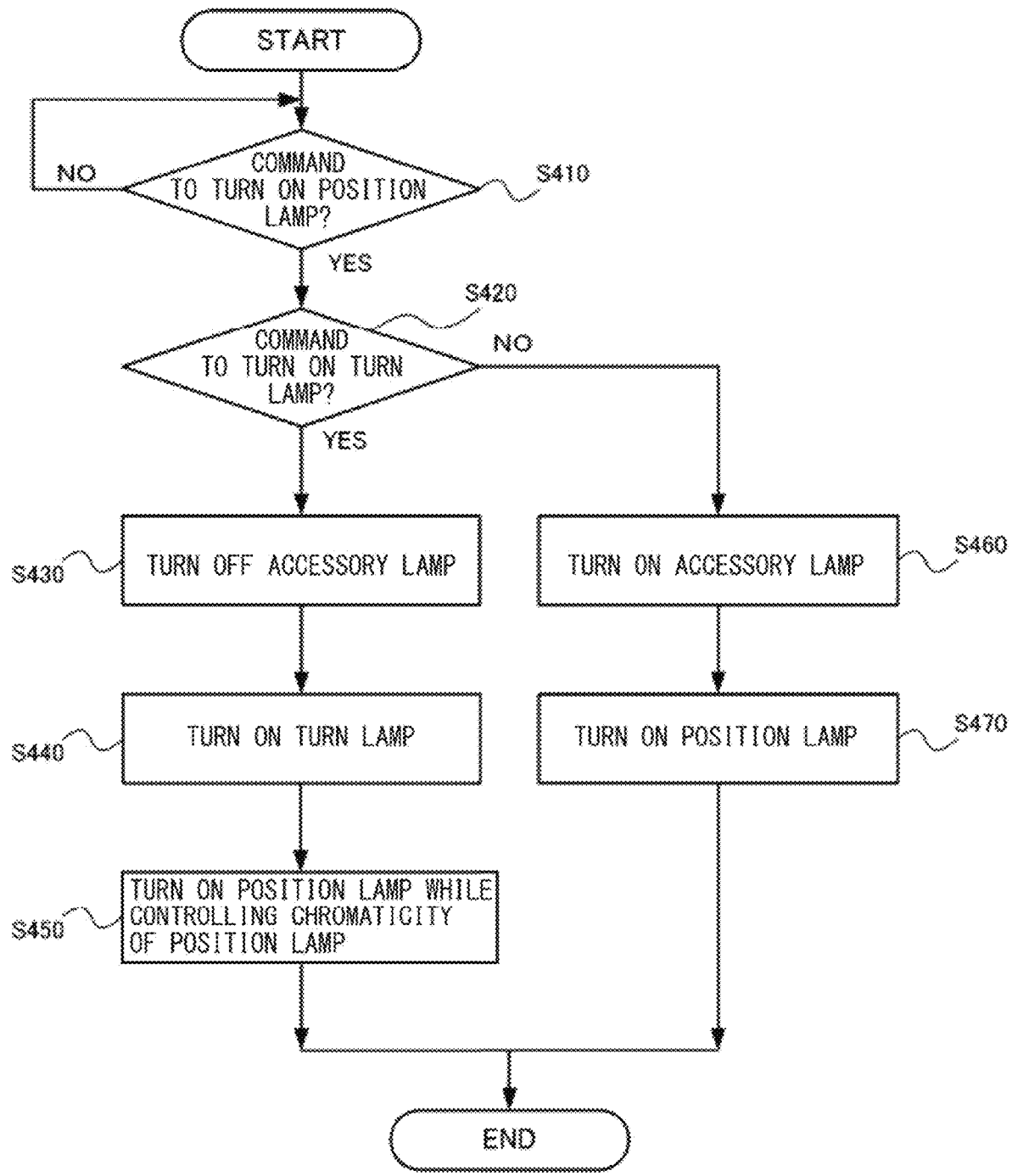

LAMP LIGHTING CONTROL SYSTEM

CROSS REFERENCE TO RELATED APPLICATIONS

This application is the U.S. National Phase under 35 US.C. § 371 of International Application No. PCT/JP2021/035793, filed on Sep. 29, 2021, the entire contents of each are hereby incorporated by reference.

TECHNICAL FIELD

The present invention relates to a lamp lighting control system.

BACKGROUND ART

A combination lamp, which is an assembly of lights including a head lamp (headlight), a turn lamp, a position lamp, and an accessary lamp of a vehicle such as an automobile has been known (refer to Patent Literature 1, for example).

Such a combination lamp generally includes devices such as light emitting diodes (LEDs) as a light source, to thereby emit color light beams such as red, orange, and white light beams to respective regions.

A mounting space of such a combination lamp is limited due to functional constraints of vehicles such as automobiles, traveling standards for vehicles, design constraints, and other factors.

Further, in view of safety, the combination lamp needs to explicitly indicate information on the presence and the traveling direction of the vehicle to another vehicle, such as an automobile, visually recognized. That is, the combination lamp needs to form a signature that makes the width of the vehicle, direction indication, or the like visually recognizable.

CITATION LIST

Patent Literature

Patent Literature 1: Japanese Unexamined Patent Application Publication No. 2006-286262

SUMMARY OF INVENTION

Problem to be Solved by the Invention

However, according to the regulations in the North America, it is not permitted to turn off the position lamp while the turn lamp is turned on.

Thus, there is a problem with a combination lamp designed in view of merchantability to include a position lamp emitting white light in that the turn lamp does not satisfy chromaticity requirements when the turn lamp and the position lamp are caused to emit light from the same light-emitting face.

A possible measure to address such a concern is to increase the brightness of the turn lamp by increasing the amount of current supplied to the turn lamp in order to satisfy the chromaticity requirements for the turn lamp.

However, this method yields another problem that, as the amount of current supplied to the turn lamp increases, the electric consumption of the turn lamp increases greater than the electric consumption of a bulb (light bulb) generally used in a head lamp.

Another possible measure to address the concern described above is to design the position lamp to emit orange light in order to prevent color mixture.

However, this method yields another problem that the merchantability is impaired by the position lamp emitting orange light which is different from an intended light color.

An object of the present invention that has been made in view of the problems described above is thus to provide a lamp lighting control system that makes it possible to secure the merchantability while complying with the regulations in the North America.

Means for Solving the Problem

Aspect 1: According to one or more embodiments of the present invention, a lamp lighting control system is proposed that includes: a turn lamp; a position lamp configured to provide a light-emitting face included in a light-emitting face provided by the turn lamp; an accessory lamp configured to provide a light-emitting face at least partially identical to the light-emitting face provided by the turn lamp; and a lighting control unit configured to control lighting states of the turn lamp, the position lamp, and the accessory lamp, in which the lighting control unit includes one or more processors and one or more memories communicably coupled to the one or more processors, and the one or more processors are configured to turn off the accessory lamp in a case where the position lamp is turned on and the turn lamp is turned on, and turn on the accessory lamp in a case where the position lamp is turned on and the turn lamp is turned off.

Effects of the Invention

According to one or more embodiments of the present invention, it is possible to provide an effect that the merchantability is secured while complying with the regulations in the North America.

BRIEF DESCRIPTION OF DRAWINGS

FIG. 1 is a diagram illustrating a configuration of a lamp lighting control system according to one embodiment of the present invention.

FIG. 2 is a diagram illustrating a configuration of a combination lamp in the lamp lighting control system according to the embodiment of the present invention.

FIG. 3 is a flowchart of a process performed by a lighting control unit in the lamp lighting control system according to one embodiment of the present invention when a light switch is turned off while a vehicle is traveling.

FIG. 4 is a diagram illustrating a lighting state of the combination lamp observed upon the process performed by the lighting control unit in the lamp lighting control system according to the embodiment of the present invention when the light switch is turned off while the vehicle is traveling.

FIG. 5 is a diagram illustrating a lighting state of the combination lamp observed upon the process performed by the lighting control unit in the lamp lighting control system according to the embodiment of the present invention when the light switch is turned off while the vehicle is traveling.

FIG. 6 is a flowchart of a process performed by the lighting control unit in the lamp lighting control system according to one embodiment of the present invention when the light switch is turned on to a first stage while the vehicle is traveling.

FIG. 7 is a diagram illustrating a lighting state of the combination lamp observed upon the process performed by the lighting control unit in the lamp lighting control system according to one embodiment of the present invention when the light switch is turned on to the first stage while the vehicle is traveling.

FIG. 8 is a diagram illustrating a lighting state of the combination lamp observed upon the process performed by the lighting control unit in the lamp lighting control system according to one embodiment of the present invention in a case where the light switch is turned on to the first stage while the vehicle is traveling.

FIG. 9 is a flowchart of a process performed by the lighting control unit in the lamp lighting control system according to one embodiment of the present invention when the light switch is turned on to a second stage while the vehicle is traveling.

FIG. 10 is a diagram illustrating a lighting state of the combination lamp observed upon the process performed by the lighting control unit in the lamp lighting control system according to one embodiment of the present invention when the light switch is turned on to the second stage while the vehicle is traveling.

FIG. 11 is a diagram illustrating a lighting state of the combination lamp observed upon the process performed by the lighting control unit in the lamp lighting control system according to one embodiment of the present invention when the light switch is turned on to the second stage while the vehicle is traveling.

FIG. 12 is a flowchart of lighting control on an accessory lamp based on lighting states of a position lamp and a turn lamp in the lamp lighting control system according to one embodiment of the present invention.

MEANS FOR SOLVING THE PROBLEM

In the following, some embodiments of the present invention are described with reference to FIGS. 1 to 12.

EMBODIMENTS

A lamp lighting control system 1 according to an embodiment is described with reference to FIGS. 1 to 12.
<Configuration of Lamp Lighting Control System 1>
As illustrated in FIG. 1, the lamp lighting control system 1 according to the present embodiment includes a combination lamp 100 and a lighting control unit 200.

The combination lamp 100 has, for example, an improved design in which lamps to be provided on a front portion of the vehicle are integrated with each other. The combination lamp has a structure in which a lens and a lamp are separated from each other.

The combination lamp 100 further has a light-emitting face 150 to be described later on its upper surface.

The lighting control unit 200 includes one or more processors and one or more memories communicably coupled to the one or more processors.

For example, the one or more processors are each an electronic control unit (ECU) of the vehicle. The one or more processors control lighting of the lamps including a head lamp 110, a turn lamp 120, an accessory lamp 130, and a position lamp 140 in accordance with control programs stored in the one or more memories communicably coupled to the one or more processors and lighting conditions of these lamps.

In the present embodiment, the lighting control unit 200 performs lighting control in accordance with the control programs stored in the one or more memories communicably coupled to the one or more processors as follows. For example, when the position lamp 140 and the turn lamp 120 are turned on, the lighting control unit 200 turns off the accessory lamp 130. When the position lamp 140 is turned on and the turn lamp 120 is turned off, the lighting control unit 200 turns on the accessory lamp 130.
<Configuration of Combination Lamp 100>
The combination lamp 100 is to be provided on, for example, a front end portion of a vehicle such as a car. As illustrated in FIG. 1, the combination lamp 100 includes the head lamp 110, the turn lamp 120, the accessory lamp 130, the position lamp 140, and the light-emitting face 150.

As illustrated in FIG. 2, the head lamp 110 is provided at a substantially central portion of the combination lamp 100. For example, the head lamp 110 includes a bulb, an inner lens unit, and a reflex reflector unit that are not illustrated.

Further, the head lamp 110 is switchable between high beam (horizontal and far-distance beam) and low beam (downward beam with a reduced amount of light) in response to operations of the inner lens unit.

As illustrated in FIG. 2, the turn lamp 120 is provided on a lower right end portion of the head lamp 110. For example, the turn lamp 120 is a front turn signal lamp (a front direction indicator) including components such as a LED emitting yellow light. The turn lamp 120 is turned on in response to an operation on a direction indicator switch or a hazard switch.

As illustrated in FIG. 2, the turn lamp 120 is provided on a lower portion of the light-emitting face 150 which is shared by the accessory lamp 130 to be described later.

The accessory lamp 130 performs a function similar to that of a front fog lamp. The accessory lamp 130 is turned on not only in the night-time but also in the daytime to improve the design of the vehicle.

As illustrated in FIG. 2, the accessory lamp 130 is provided in the vicinity of a lower right end portion of the turn lamp 120 and on a lower portion of the light-emitting face 150 which is shared by the turn lamp 120.

The position lamp 140 is a side-marker light. For example, the position lamp 140 includes components such as an LED emitting white light. The position lamp 140 is, literally, a lighting device that notifies other vehicles and pedestrians of the width of the vehicle in the night or dark locations, for example.

As illustrated in FIG. 2, the position lamp 140 is provided at a central portion of a right end portion of the combination lamp 100 as seen in front view, and provided on a lower portion of the light-emitting face 150 which is shared by the turn lamp 120 and the accessory lamp 130.

As illustrated in FIG. 2, the light-emitting face 150 is formed into a substantially U-shape. The light-emitting face 150 is provided such that one side of the light-emitting face 150 faces a side in front of the vehicle as seen in front view.
<Process Performed by Lamp Lighting Control System 1>
A process to be performed by the lamp lighting control system 1 according to the present embodiment is described with reference to FIGS. 3 to 12.
<Process Performed by Lamp Lighting Control System 1 when Light SW is Turned Off while Vehicle is Traveling>
As illustrated in FIG. 3, when a light SW is turned off while the vehicle is traveling, the lighting control unit 200 determines whether a command to turn on the turn lamp 120 has been issued (Step S110).

In a case where the lighting control unit 200 determines that the command to turn on the turn lamp 120 has been issued (Step S110: YES), the lighting control unit 200 turns off the head lamp 110 as illustrated in FIG. 5 (in FIG. 5, the head lamp 110 is illustrated as a hollow circle defined by a solid line) (Step S120), turns off the accessory lamp 130 as illustrated in FIG. 5 (in FIG. 5, the accessory lamp 130 is illustrated as a hollow circle defined by a dotted line) (Step S130), turns on the turn lamp 120 (in FIG. 5, the turn lamp 120 is illustrated as a solid circle defined by a solid line) (Step S140), and ends the process.

At this time, light such as yellow light is emitted outside from the turn lamp 120 through the light-emitting face 150, forming a yellow signature having a substantially U-shape.

Further, at this time, the accessory lamp 130 is turned off (in FIG. 5, the accessory lamp 130 is illustrated as a hollow circle defined by a dotted line), and the position lamp 140 is turned off (in FIG. 5, the position lamp 140 is illustrated as a hollow circle defined by a dotted line).

In contrast, in a case where the lighting control unit 200 determines that no command to turn on the turn lamp 120 has been issued (Step S110: NO), the lighting control unit 200 brings the head lamp 110 into a daytime running lights (DRL) mode as illustrated in FIG. 4 (in FIG. 4, the head lamp 110 is illustrated as a solid circle defined by a solid line) (Step S150), turn on the accessory lamp 130 as illustrated in FIG. 4 (in FIG. 4, the accessory lamp 130 is illustrated as a solid circle defined by a solid line) (Step S160), and ends the process.

At this time, light such as transparent light is emitted outside from the accessory lamp 130 through the light-emitting face 150, forming a transparent signature having a substantially U-shape.

Further, at this time, the turn lamp 120 is turned off (in FIG. 4, the turn lamp 120 is illustrated as a hollow circle defined by a dotted line), and the position lamp 140 is turned off (in FIG. 4, the position lamp 140 is illustrated as a hollow circle defined by a dotted line).

<Process Performed by Lamp Lighting Control System 1 when Light SW is Turned on at First Level while Vehicle is Traveling>

As illustrated in FIG. 6, when the light SW is turned on at a first level while the vehicle is traveling, the lighting control unit 200 determines whether a command to turn on the turn lamp 120 has been issued (Step S110).

In a case where the lighting control unit 200 determines that the command to turn on the turn lamp 120 has been issued (Step S110: YES), the lighting control unit 200 turns off the head lamp 110 as illustrated in FIG. 8 (in FIG. 8, the head lamp 110 is illustrated as a hollow circle defined by a dotted line) (Step S120), turns off the accessory lamp 130 as illustrated in FIG. 8 (in FIG. 8, the accessory lamp 130 is illustrated as a hollow circle defined by a dotted line) (Step S130), and turns on the turn lamp 120 (in FIG. 8, the turn lamp 120 is illustrated as a solid circle defined by a solid line) (Step S140).

Further, the lighting control unit 200 turns on the position lamp 140 (in FIG. 8, the position lamp 140 is illustrated as a solid circle defined by a solid line) while controlling the chromaticity of the position lamp 140, and ends the process.

At this time, light such as yellow light is emitted outside from the turn lamp 120 through the light-emitting face 150, and light such as white light is emitted outside from the position lamp 140 through the light-emitting face 150, forming a yellow signature having a substantially U-shape.

In the control of the chromaticity of the position lamp 140, the chromaticity of the position lamp 140 is decreased to a level not to infringe the chromaticity requirement of the turn lamp 120, i.e., a level to make the width and the direction indicator of the vehicle visually recognizable and not to impair the merchantability when another vehicle such as an automobile traveling around is visually recognized.

Specifically, for example, the amount of current to be supplied to the position lamp 140 is controlled to decrease the chromaticity of the the position lamp 140 to the level not to infringe the chromaticity requirements of the turn lamp 120, i.e., the level to make the width and the direction indicator of the vehicle visually recognizable and not to impair the merchantability when another vehicle such as an automobile travelling around is visually recognized.

In contrast, in a case where the lighting control unit 200 determines that no command to turn on the turn lamp 120 has been issued (Step S120: NO), the lighting control unit 200 brings the head lamp 110 into the daytime running lights (DRL) mode as illustrated in FIG. 7 (in FIG. 7, the head lamp 110 is illustrated as a solid circle defined by a solid line) (Step S150), turns on the accessory lamp 130 as illustrated in FIG. 87 (in FIG. 7, the accessory lamp 130 is illustrated as a solid circle defined by a solid line) (Step S160), turns on the position lamp 140 (in FIG. 7, the position lamp 140 is illustrated as a solid circle defined by a solid line) (Step S220), and ends the process.

At this time, light such as transparent light is emitted outside from the accessory lamp 130 through the light-emitting face 150, and light such as white light is emitted outside from the position lamp 140 through the light-emitting face 150, forming a white signature having a substantially U-shape.

Further, at this time, the turn lamp 120 is turned off (in FIG. 7, the turn lamp 120 is illustrated as a hollow circle defined by a dotted line).

<Process Performed by Lamp Lighting Control System 1 when Light SW is Turned on at Second Level while Vehicle is Traveling>

As illustrated in FIG. 9, when the light SW is turned on at a second stage while the vehicle is traveling, the lighting control unit 200 causes the head lamp 110 to emit a low beam as illustrated in FIGS. 10 and 11 (in each of FIGS. 10 and 11, the head lamp 110 is illustrated as a solid circle defined by a solid line) (Step S310).

The lighting control unit 200 determines whether the command to turn on the turn lamp 120 has been issued (Step S110).

In a case where the lighting control unit 200 determines that the command to turn on the turn lamp 120 has been issued (Step S110: YES), the lighting control unit 200 turns off the accessory lamp 130 as illustrated in FIG. 11 (in FIG. 11, the accessory lamp 130 is illustrated as a hollow circle defined by a dotted line) (Step S130), and turns on the turn lamp 120 (in FIG. 11, the turn lamp 120 is illustrated as a solid circle defined by a solid line) (Step S140).

Further, the lighting control unit 200 turns on the position lamp 140 (in FIG. 11, the position lamp 140 is illustrated as a solid circle defined by a solid line) while controlling the chromaticity of the position lamp 140, and ends the process.

At this time, light such as yellow light is emitted outside from the turn lamp 120 through the light-emitting face 150, and light such as white light is emitted outside from the position lamp 140 through the light-emitting face 150, forming a yellow signature having a substantially U-shape.

In the control of the chromaticity of the position lamp 140, the chromaticity is decreased to a level not to infringe the chromaticity requirements of the turn lamp 120. i.e., a level to make the width and the direction indicator of the vehicle visually recognizable and not to impair the merchantability when another vehicle such as an automobile traveling around is visually recognized.

Specifically, for example, the amount of current to be supplied to the position lamp 140 is controlled to decrease the chromaticity of the position lamp 140 to the level not to infringe the chromaticity requirements of the turn lamp 120. i.e., the level to make the width and the direction indicator of the vehicle visually recognizable and not to impair the merchantability when another vehicle such as an automobile traveling around.

In contrast, in a case where the lighting control unit 200 determines that no command to turn on the turn lamp 120 has been issued (Step S120: NO), the lighting control unit 200 turns on the accessory lamp 130 as illustrated in FIG. 10 (in FIG. 10, the accessory lamp 130 is illustrated as a solid circle defined by a solid line) (Step S160), turns on the position lamp 140 (in FIG. 10, the position lamp 140 is illustrated as a solid circle defined by a solid line) (Step S220), and ends the process.

At this time, light such as transparent light is emitted outside from the accessory lamp 130 through the light-emitting face 150, and light such as white light is emitted outside from the position lamp 140 through the light-emitting face 150, forming a white signature having a substantially U-shape.

Further, at this time, the turn lamp 120 is turned off (in FIG. 10, the turn lamp 120 is illustrated as a hollow circle defined by a dotted line).

<Chromaticity Control of Position Lamp 140 and Lighting Control of Accessory Lamp 130 Based on Lighting States of Position Lamp 140 and Turn Lamp 120>

Chromaticity control of the position lamp 140 and lighting control of the accessory lamp 130 based on lighting states of the position lamp 140 and the turn lamp 120 in accordance with the processes illustrated in FIGS. 3, 6, and 9 are described with reference to FIG. 12.

As illustrated in FIG. 12, in a case where a command to turn on the position lamp 140 has been issued (Step S410: YES) and where a command to turn on the turn lamp 120 has been issued (Step S420: YES), the lighting control unit 200 turns off the accessory lamp 130 (Step S430), and turns on the turn lamp 120 (Step S440). Thereafter, the lighting control unit 200 turns on the position lamp 140 while controlling the chromaticity of the position lamp 140 (Step S450), and ends the process.

In contrast, in a case where the command to turn on the position lamp 140 has been issued (Step S410: YES) and where the command to turn on the turn lamp 120 has not been issued (Step S420: NO), the lighting control unit 200 turns on the accessory lamp 130 (Step S460), turns on the position lamp 140 (Step S470), and ends the process.

<Workings and Effects>

As described above, the lamp lighting control system 1 according to the present embodiment includes the turn lamp 120, the position lamp 140 configured to provide a light-emitting face 150 included in the light-emitting face 150 by the turn lamp 120, the accessory lamp 130 configured to provide a light-emitting face 150 at least partially identical to the light-emitting face 150 by the turn lamp 120, and the lighting control unit 200 configured to control lighting states of the turn lamp 120, the position lamp 140, and the accessory lamp 130. The lighting control unit 200 includes the one or more processors and the one more memories communicably coupled to the one or more processors. When the position lamp 140 and the turn lamp 120 are turned on, the one or more processors turn off the accessory lamp 130, whereas when the position lamp 140 is turned on and the turn lamp 120 is turned off, the one or more processors turn on the accessory lamp 130.

That is, when the turn lamp 120 is turned on, the position lamp 140 is turned on, which complies with the regulations in the North America.

Further, when the position lamp 140 is turned on and the turn lamp 120 is turned off, the accessory lamp 130 is turned on. Accordingly, the amount of light is compensated by light emission of the accessory lamp 130. This improves the design of the signature formed by light emission of the position lamp 140, resulting in an improvement in the merchantability of the combination lamp 100, and, in turn, the merchantability of the vehicle.

Further, when the position lamp 140 and the turn lamp 120 are turned on, the accessory lamp 130 is turned off, whereas, when the position lamp 140 is turned on and the turn lamp 120 is turned off, the accessory lamp 130 is turned on. Accordingly, it is possible to achieve the same lighting appearance of the signature at any hour of day or night.

Further, the lighting states of the position lamp 140 and the turn lamp 120 are controlled as described above. Accordingly, it is possible to comply with operational conditions specified by the regulations in the North America.

Moreover, in the lamp lighting control system 1 according to the present embodiment, the one or more processors in the lighting control unit 200 performs the control to decrease the chromaticity of the position lamp 140 to a level lower than the chromaticity of the turn lamp 120 when at least the turn lamp 120 and the position lamp 140 are turned on.

Accordingly, it is possible to form an appropriate signature without infringing the chromaticity requirements of the turn lamp 120.

Further, in the lamp lighting control system 1 according to the present embodiment, the position lamp 140 is a white light lamp.

Accordingly, when the turn lamp 120 is turned off, it is possible to form a white signature in order to improve the design. This results in an improvement of the merchantability of the combination lamp 100, and, in turn, the merchantability of the vehicle.

Modification Example 1

In the lamp lighting control system 1 according to the present embodiment, the lighting control unit 200 performs the control to decrease the chromaticity of the position lamp 140 to a level lower than the chromaticity of the turn lamp 120 when the turn lamp 120 and the position lamp 140 are turned on. However, in a case where the chromaticity of the position lamp 140 is controlled by controlling the amount of current to be supplied to the position lamp 140, the lighting control unit 200 may perform the control to decrease the chromaticity of the position lamp 140 to a level lower than the chromaticity of the turn lamp 120 at all times. Such control makes it possible to form an appropriate signature without infringing the chromaticity requirements of the turn lamp 120, and reduces the electric consumption.

Modification Example 2

In the present embodiment, the turn lamp 120, the accessory lamp 130, and the position lamp 140 are provided on a lower portion of the same light-emitting face 150. However, a part of the the accessory lamp 130 may be provided on the lower portion of the light-emitting face 150.

Note that the process to be performed by the lighting control unit 200 may be stored in a storage medium readable by a computer system. The program stored in the storage medium is read and executed by the lighting control unit 200 to achieve the lamp lighting control system 1 according to the present invention.

The term "computer system" used herein encompasses hardware such as an OS and peripheral devices.

In a case where the world wide web (www) system is used, the term "computer system" encompasses a website providing environment (or a display environment). Alternatively, the program may be transmitted from the computer system provided with the storage device or the like storing the program to another computer system via a transmission medium or by means of a transmission wave of a transmission medium. Herein, the term "transmission medium" for transmitting the program refers to a medium with a function of transmitting information like a network (communication network) such as the Internet or a telecommunication line (a communication line) such as a phone line.

Alternatively, the program may be one for achieving some of the functions described above. Still alternatively, the program may be a so-called differential file (differential program) implemented by combining the program with another program stored in the computer system in advance.

Some of the embodiments of the present invention are described in detail above with reference to the drawings. However, specific configurations are not limited to these embodiments, and design or the like within a range without departing from the gist of the present invention may be also included.

DESCRIPTION OF REFERENCE NUMERALS

1: lamp lighting control system
100: combination lamp
110: head lamp
120: turn lamp
130: accessory lamp
140: position lamp
150: light-emitting face
200: lighting control unit

The invention claimed is:

1. A lamp lighting control system for a vehicle, the lamp lighting control system comprising:
    a turn lamp including a first light source;
    a position lamp including a second light source;
    an accessory lamp including a third light source;
    a light-emitting face having a shape, wherein the light-emitting face is optically coupled with, and shared by, the turn lamp, the position lamp, and the accessory lamp such that light from each of the turn lamp, the position lamp, and the accessory lamp is uniformly distributed across the shape; and
    a lighting control unit comprising one or more processors and one or more memories having programs, when executed, causing the one or more processors to be programmed to:
        control lighting states of the turn lamp, the position lamp, and the accessory lamp;
        turn off the accessory lamp in a case where the position lamp is turned on and the turn lamp is turned on; and
        turn on the accessory lamp in a case where the position lamp is turned on and the turn lamp is turned off, and
    wherein, when (1) the position lamp is turned on, (2) the turn lamp is turned on, and (3) the accessory lamp is turned off, the one or more processors are programmed to:
        control the second light source of the position lamp to continue emitting light while the first light source of the turn lamp emits light; and
        control a luminance of the second light source of the position lamp to decrease to a level that is lower than a luminance of the first light source of the turn lamp, but is not zero.

2. The lamp lighting control system according to claim 1, wherein the position lamp comprises a white light lamp.

3. A lamp lighting control system for a vehicle, the lamp lighting control system comprising:
    a turn lamp including a first LED configured to emit yellow light;
    a position lamp including a second LED configured to emit white light;
    an accessory lamp;
    a light-emitting face having a shape, wherein the light-emitting face is optically coupled with, and shared by, the turn lamp, the position lamp, and the accessory lamp such that light from each of the turn lamp, the position lamp, and the accessory lamp is uniformly distributed across the shape; and
    a circuitry programmed to;
        control lighting states of the turn lamp, the position lamp, and the accessory lamp;
        turn off the accessory lamp in a case where the position lamp is turned on and the turn lamp is turned on; and
        turn on the accessory lamp in a case where the position lamp is turned on and the turn lamp is turned off,
    wherein, in response to a condition where (1) the position lamp is turned on, (2) the turn lamp is turned on, and (3) the accessory lamp is turned off, the circuitry is programmed to:
        automatically control the second LED to continue emitting light while the first LED emits light; and
        automatically control a luminance of the second LED to a first luminance that is lower than a luminance of the first LED, but is not zero, so that the light-emitting face emits a yellow light when viewed from outside of the vehicle, and
    wherein, in response to a condition where (1) the position lamp is turned on, (2) the turn lamp is turned off, and (3) the accessory lamp is turned off, the circuitry is programmed to:
        automatically control the second LED to continue emitting light; and
        automatically control the luminance of the second LED to a second luminance higher than the first luminance so that the light-emitting face emits a white light at a predetermined luminance to the outside of the vehicle.

4. A lamp lighting control system for a vehicle, the lamp lighting control system comprising:
    a turn lamp including a first LED configured to emit yellow light;
    a position lamp including a second LED configured to emit white light;
    an accessory lamp;
    a light-emitting face having a shape, wherein the light-emitting face is optically coupled with, and shared by, the turn lamp, the position lamp, and the accessory lamp such that light from each of the turn lamp, the position lamp, and the accessory lamp is distributed across the shape; and
    a circuitry programmed to;
        control lighting states of the turn lamp, the position lamp, and the accessory lamp;

turn off the accessory lamp in a case where the position lamp is turned on and the turn lamp is turned on; and
turn on the accessory lamp in a case where the position lamp is turned on and the turn lamp is turned off,
wherein, in response to a condition where (1) the position lamp is turned on, (2) the turn lamp is turned on, and (3) the accessory lamp is turned off, the circuitry is programmed to:
automatically control the second LED to continue emitting light while the first LED emits light; and
automatically control an amount of a current of the second LED to a predetermined first value that is not zero, and
wherein, in response to a condition where (1) the position lamp is turned on, (2) the turn lamp is turned off, and (3) the accessory lamp is turned off, the circuitry is programmed to:
automatically control the second LED to continue emitting light; and
automatically control the amount of the current of the second LED to a predetermined second value greater than the predetermined first value.

* * * * *